US007828476B2

(12) United States Patent
Frankel et al.

(10) Patent No.: US 7,828,476 B2
(45) Date of Patent: Nov. 9, 2010

(54) INFRARED INSPECTION AND REPORTING PROCESS

(75) Inventors: Donald Frankel, Shaker Heights, OH (US); Joseph Cobb, University Heights, OH (US); Shawn Goertzen, Cuyahoga Falls, OH (US)

(73) Assignee: Predictive Services, LLC, Cleveland, OH (US)

(*) Notice: Subject to any disclaimer, the term of this patent is extended or adjusted under 35 U.S.C. 154(b) by 110 days.

(21) Appl. No.: 12/035,836

(22) Filed: Feb. 22, 2008

(65) Prior Publication Data

US 2008/0140486 A1 Jun. 12, 2008

Related U.S. Application Data

(62) Division of application No. 11/173,194, filed on Jul. 1, 2005, now Pat. No. 7,357,571.

(51) Int. Cl.
*G01J 5/00* (2006.01)
*G05D 23/00* (2006.01)

(52) U.S. Cl. ......................... 374/121; 374/45; 374/159; 374/141; 374/152; 700/291

(58) Field of Classification Search ..................... 374/4, 374/45, 57, 120, 121, 141, 137, 112, 100, 374/208, 29, 152, 159; 250/338.1; 340/870.17; 702/130–136; 364/464.01, 464.04, 63; 705/400, 705/401, 402, 412, FOR. 100, 7; 700/32, 700/36, 28, 46, 65, 108, 286, 291; 716/2
See application file for complete search history.

(56) References Cited

U.S. PATENT DOCUMENTS

| | | | | |
|---|---|---|---|---|
| 4,522,511 | A * | 6/1985 | Zimmerer | 374/32 |
| 5,713,030 | A * | 1/1998 | Evoy | 713/322 |
| 6,178,393 | B1 * | 1/2001 | Irvin | 703/10 |
| 6,742,349 | B1 * | 6/2004 | Kawai et al. | 62/207 |
| 7,334,198 | B2 * | 2/2008 | Ditzel et al. | 716/1 |
| 7,428,441 | B2 * | 9/2008 | Walters | 700/97 |
| 7,428,919 | B2 * | 9/2008 | Young et al. | 165/11.1 |
| 2003/0014742 | A1 * | 1/2003 | Seth et al. | 717/158 |
| 2006/0021739 | A1 * | 2/2006 | Young et al. | 165/104.33 |
| 2008/0147465 | A1 * | 6/2008 | Raines et al. | 705/7 |
| 2008/0243421 | A1 * | 10/2008 | Siegel et al. | 702/136 |
| 2009/0063094 | A1 * | 3/2009 | Havener et al. | 702/179 |
| 2009/0228406 | A1 * | 9/2009 | Lopez et al. | 705/412 |

* cited by examiner

*Primary Examiner*—Gail Verbitsky
(74) *Attorney, Agent, or Firm*—Porter, Wright, Morris & Arthur, LLP

(57) ABSTRACT

An infrared inspection and reporting process and system obtains inspection data on site via a portable computer. An actual temperature of a component derived from an infrared image and a temperature delta between the temperature of the component and the maximum temperature for the component is calculated to determine if there is a problem. A criticality level is assigned for each problem component from a plurality of criticality levels each having a predetermined range for the temperature delta. The criticality level provides an accurate and consistent assessment of component conditions. The inspection data is up linked to a home server from the portable computer and is made available to the customer via an interactive, on-line web application. The customer can interact with the inspection dating including an interactive prediction of energy savings if the problem component is repaired.

16 Claims, 13 Drawing Sheets

INFRARED INSPECTION AND REPORTING PROCESS

CROSS-REFERENCE TO RELATED APPLICATIONS

This application is a divisional application of U.S. patent application Ser. No. 11/173,194 filed on Jul. 1, 2005, now U.S. Pat. No. 7,357,571 the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to infrared inspections for identifying items that require adjustments, maintenance, replacement, or the like prior to scheduled service.

BACKGROUND OF THE INVENTION

Infrared thermography uses infrared imaging and measurement cameras to produce images of infrared or "heat" radiation. Most system components get hot before failure. Therefore, infrared cameras are a cost effective and valuable tool for predictive maintenance. In predictive maintenance, the infrared cameras are used to inspect systems in order to locate problems prior to failure, that is, to predict failure of components. Once a problem is located, the component is adjusted, fixed, or replaced prior to its failure. Finding and fixing problems before the components fail saves costs associated with manufacturing downtime, production losses, power outages, fire, catastrophic failures, employee injuries, and many other types of losses.

Finding a potential problem by obtaining an image with an infrared camera is sometimes not enough. An infrared camera image alone says very little about the condition of a component such as a poor electrical connection or a worn mechanical part. Many components operate properly at temperatures significantly above ambient temperature. An image without proper temperature measurement can be misleading because it may visually suggest a problem that does not exist. The infrared image must be properly interpreted to determine if there truly is a problem. Unfortunately there is not an industry standard or commonly used method for interpreting the infrared images and determining the criticality of the problem. Thus interpretations can vary between different inspectors and even between different inspections by the same inspector.

The problem of inaccurate and inconsistent reporting is amplified for companies that have a number of different locations. Multi-location companies are typically inundated with many paper reports, most likely prepared by several different providers, with varied content and quality. With these varied reports, it is difficult to determine the true priorities of the problems, to determine which problems should be repaired and when, and to track the problems over time by equipment and/or location. Accordingly, there is a need in the art for an improved infrared inspection and reporting process and system.

SUMMARY OF THE INVENTION

The present invention provides an improved infrared inspection and reporting process and system wherein all inspection data is obtained on site via a portable computer as infrared images are obtained. Problems are identified in real time and criticality is determined for each problem. The inspection data is up linked to a home server of the service provider from the portable computer and is made available to the customer via an interactive, on-line web application.

According to another aspect of the present invention, a method of reporting an infrared inspection comprises the steps of obtaining a temperature of a component derived from an infrared image and computing a temperature delta between the temperature of the component and a maximum desired temperature for the component. A criticality level for the component based on the temperature delta is assigned from a plurality of criticality levels each having a predetermined range for the temperature delta.

According to yet another aspect of the present invention, a method of reporting an infrared inspection comprises the steps of obtaining a temperature of a component derived from an infrared image, computing a maximum desired temperature for the component using the formula $T_{MAX}=(Load^2*Rated\ Rise)+T_{Ambient}$, wherein the Load is the electrical load on the component, the Rated Rise is the rated rise specified for the component, and the $T_{Ambient}$ is the ambient temperature surrounding the component, and computing a temperature delta between the temperature of the component and the maximum desired temperature for the component. A criticality level for the component based on the temperature delta is assigned from a plurality of criticality levels each having a predetermined range for the temperature delta. Preferably, a first one of the plurality of criticality levels is assigned when the temperature delta is in the predetermined range of about 0 to about 13 degrees F., a second one of the plurality of criticality levels is assigned when the temperature delta is in the predetermined range of about 14 to about 32 degrees F., a third one of the plurality of criticality levels is assigned when the temperature delta is in the predetermined range of about 33 to about 68 degrees, F. and a fourth one of the plurality of criticality levels is assigned when the temperature delta is in the predetermined range of about 69 degrees F. or greater.

According to yet another aspect of the present invention, a method of reporting an infrared inspection comprises the steps of identifying a component having a problem, obtaining hours of operation for the component, obtaining energy costs for the component, computing predicted energy savings if the component is repaired, and displaying the predicted energy savings.

According to yet another aspect of the present invention, a method of reporting an infrared inspection comprises the steps of obtaining a temperature of a component derived from an infrared image, identifying that the component has a problem, obtaining hours of operation for the component via an interactive online website, obtaining energy costs for the component via the interactive online website, and computing predicted energy savings if the component is repaired. The predicted energy savings is calculated using the formula Energy Savings$=t*c*f(u)*T_{Delta}$, wherein t is the hours of operation for the component over a time period of savings, c is the electrical costs for the component in $/kilowatt hr, f(u) is an empirically derived energy usage function that translates $T_{Delta}$ into kilowatts consumed per hour, and $T_{Delta}$ is a temperature delta between a temperature of the component and a maximum desired temperature for the component. The predicted energy savings is displayed via the interactive online website.

From the foregoing disclosure and the following more detailed description of various preferred embodiments it will be apparent to those skilled in the art that the present invention provides a significant advance in the technology and art of infrared inspection and reporting processes and systems. Particularly significant in this regard is the potential the invention affords for providing consistent and reliable results. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved infrared inspection and reporting process and system disclosed herein. The following detailed discussion of various alternative and preferred embodiments will illustrate the general principles of the invention with respect to inspection of electrical, building, mechanical, utility, and process equipment or systems. Other embodiments will be apparent to those skilled in the art given the benefit of this disclosure.

Figure 1A:
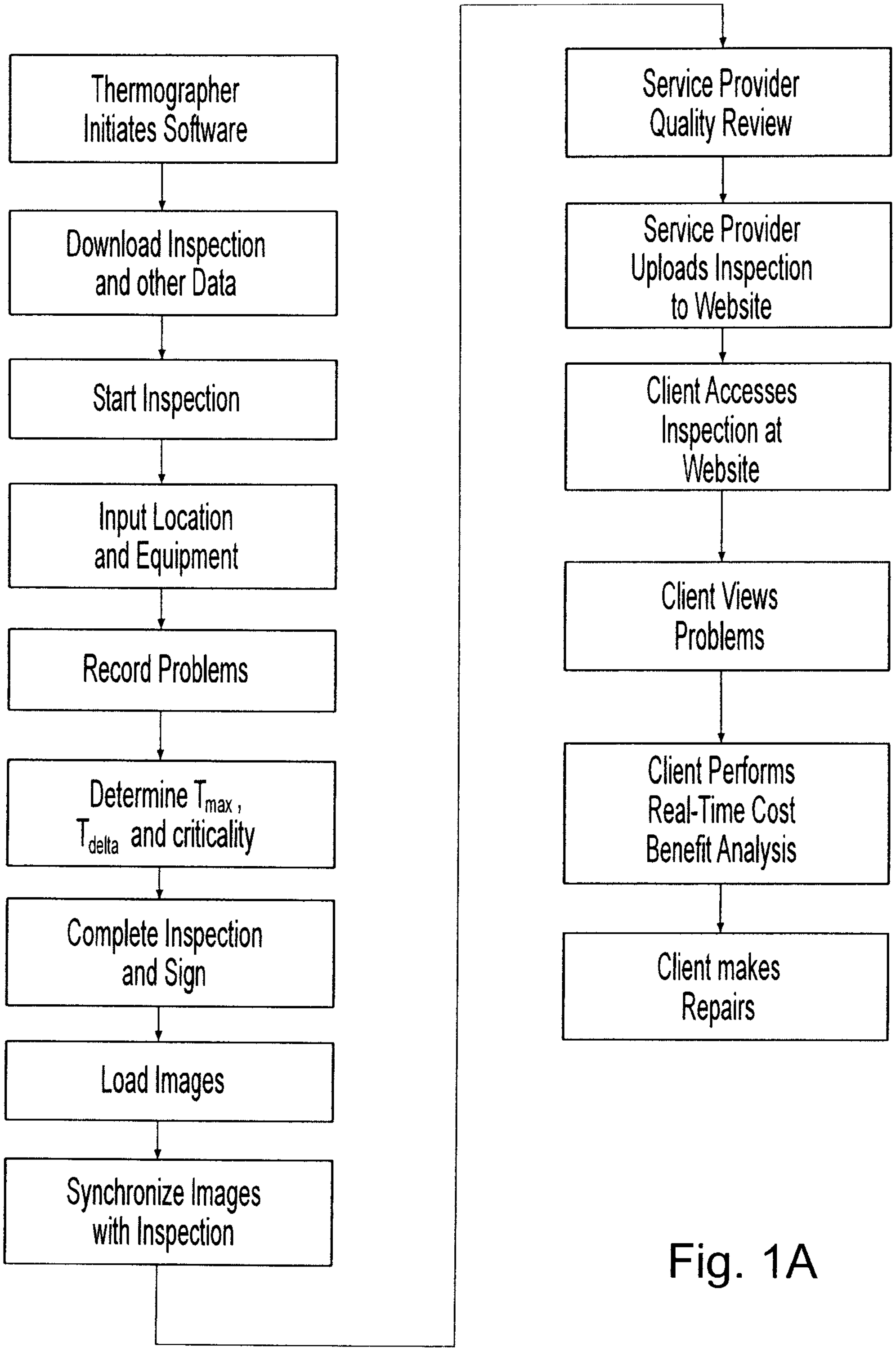
FIG. 1A is a flow diagram of an infrared inspection and reporting process and system according to the present invention.
Figure 1B:
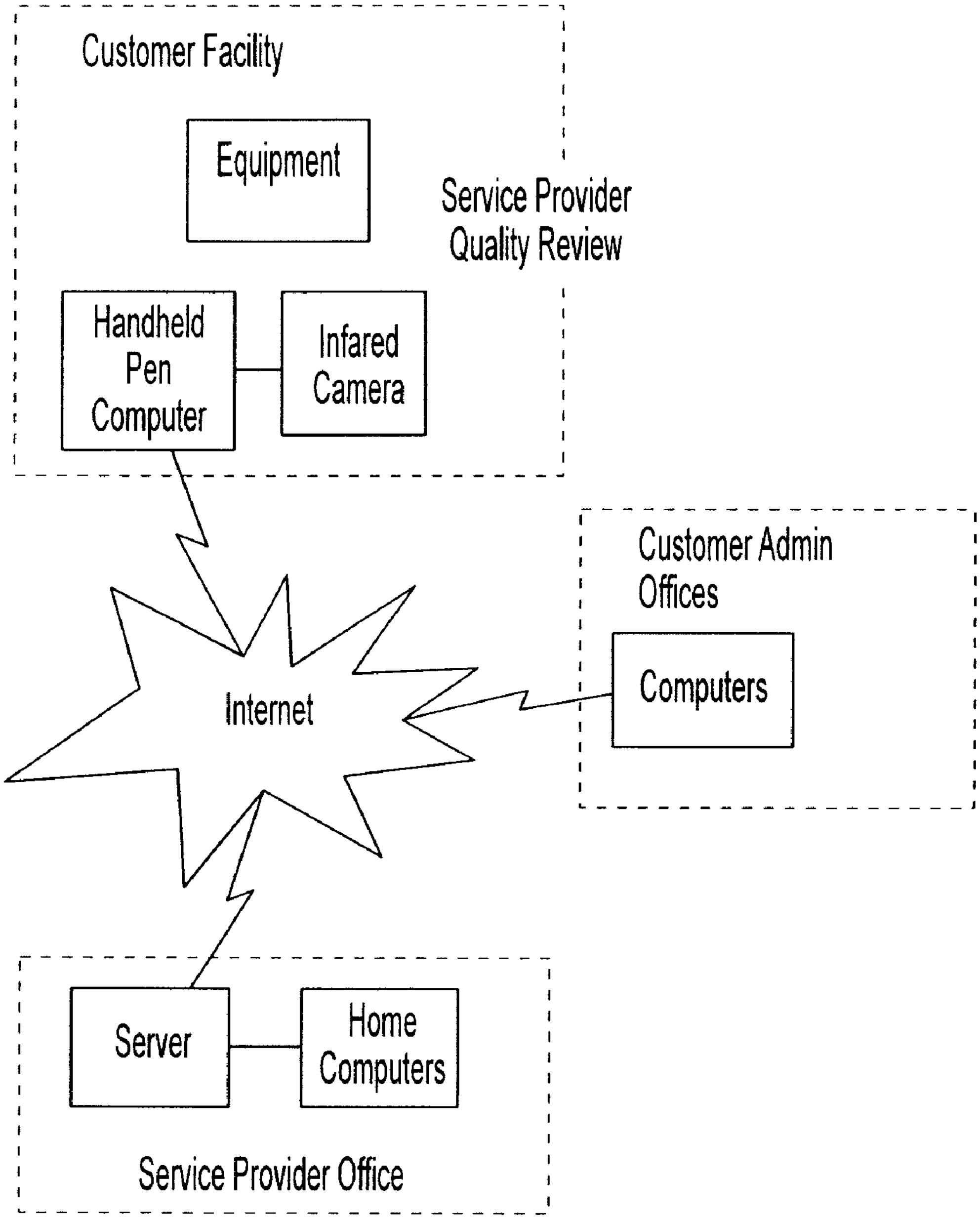
FIG. 1B is a block diagram of the infrared inspection and reporting process and system of FIG. 1.

Referring now to the drawings, FIGS. 1A and 1B show an infrared inspection and reporting process and system (10) according to the present invention. To begin an inspection at a customer's facility (12) for the first time, an inspector or technician for an inspection service provider conducts an inventory of all equipment (14) to be surveyed. The equipment (14) is preferably bar-coded for easy identification. The inspector preferably captures and inputs inspection data onsite at the facility using a portable handheld pen computer (16) or the like. For example, the inspector inputs nameplate information, equipment location, a digital control photo, current and past infrared photos, and all current and past equipment issues for each item of equipment (14). Infrared inspections are preferably conducted at the facility (12) on a consistent, regular schedule to identify problems before equipment or component failure. After the initial inspection, the inspector can easily scan the barcodes using the handheld pen computer (16) to identify the equipment (14) and obtain its history.

Figure 2:
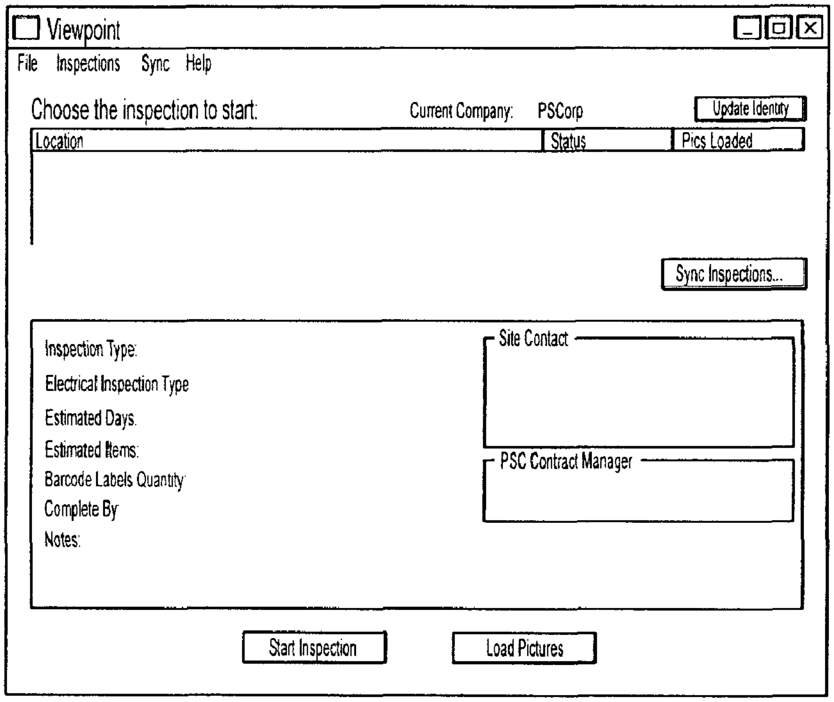
FIG. 2 is an initial setup or startup screen of software used by inspectors pursuant to the infrared inspection and reporting process and system of FIG. 1.
Figure 3:
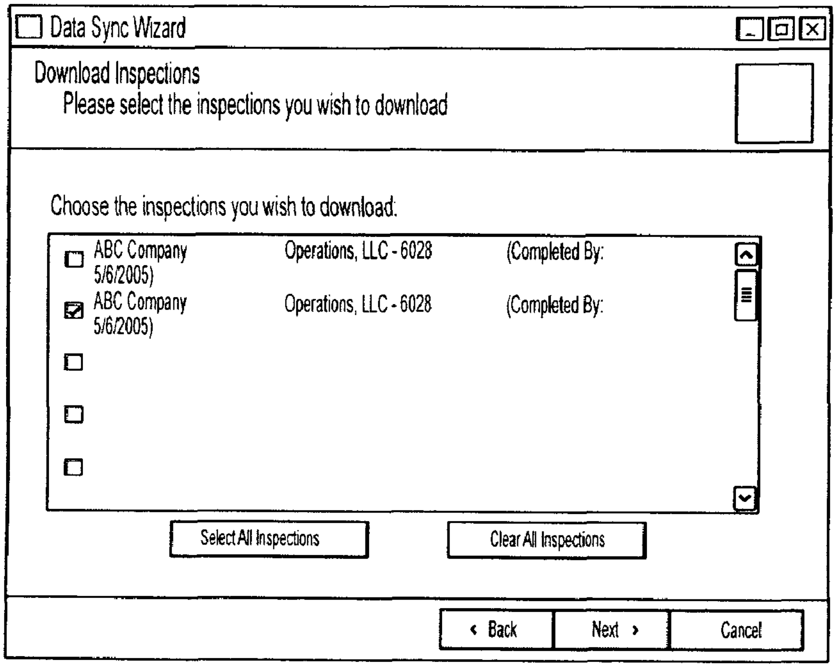
FIG. 3 is a select inspection screen of the software used by inspectors pursuant to the infrared inspection and reporting process and system of FIG. 1.

As shown in FIG. 2, the inspector initially uses the handheld pen computer (16) to initiate inspection software located thereon. A start-up screen of the software enables the inspector synchronize the inspection. To do so, the inspector selects the "Synch Inspections" button (18) to initiate a data synch wizard. The data synch wizard connects the handheld pen computer (14) of the inspector to a server (20) located at facility or office (22) of the service provider via the Internet, an intranet, a direct line, or any other suitable connection (24) so that desired inspection data can be downloaded. As shown in FIG. 3, a select inspections screen of the data synch wizard enables the inspector to choose which inspections are to be downloaded to the handheld pen computer (16).

Figure 4:
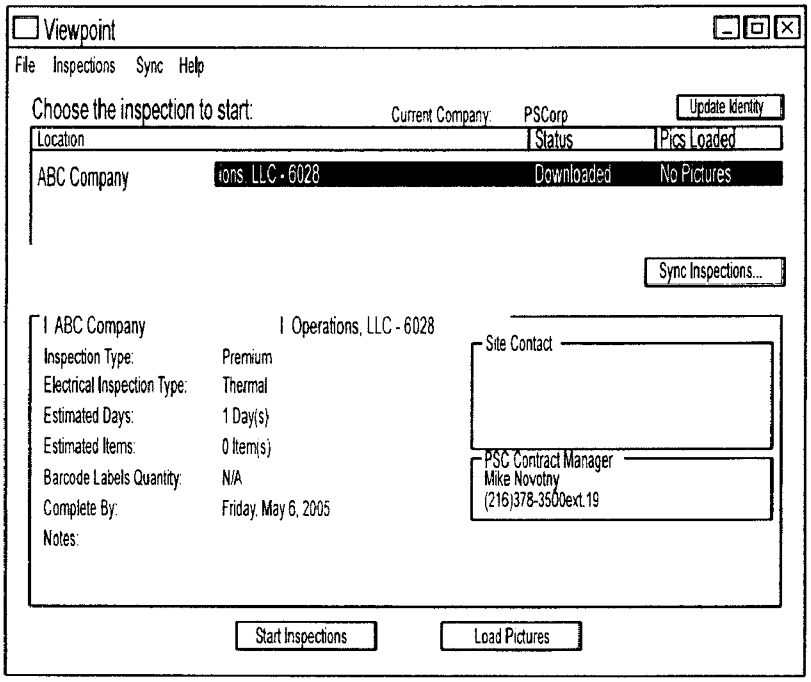
FIG. 4 is a startup screen similar to that of FIG. 2 but with a downloaded inspection.
Figure 5:
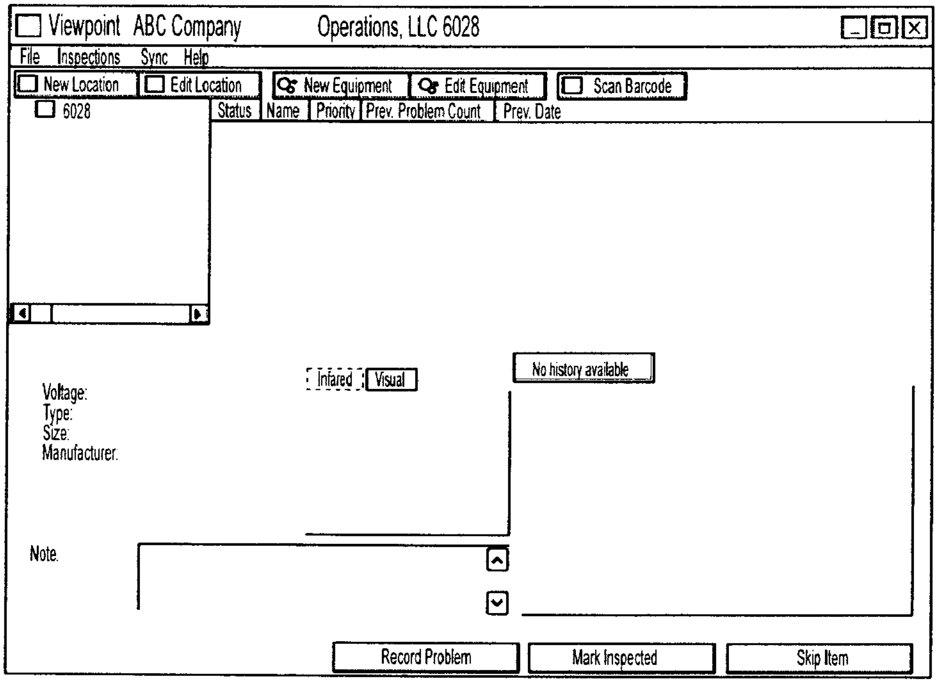
FIG. 5 is a blank inspection form screen of the software used by inspectors pursuant to the infrared inspection and reporting process and system of FIG. 1.

As shown in FIG. 4, information regarding the inspection appears on the startup screen once the data is downloaded. The information includes the inspection location, the inspection status, and whether pictures have been loaded. To begin the inspection, the inspector selects the "Start Inspection" button (26) which opens an inspection screen. As shown in FIG. 5, the inspection screen provides a list of components with the status, name, priority, previous problem count, and previous date for each listed item. Below the component list, detailed information is shown for the highlighted or selected item on the list. The illustrated detailed information includes the components voltage, type, size, manufacturer, notes, infrared or visual image, and prior history.

Figure 6:
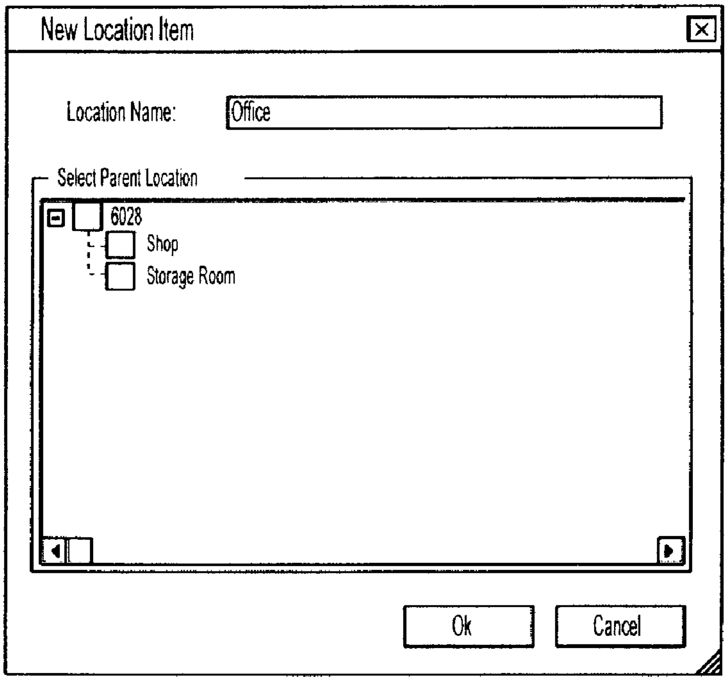
FIG. 6 is a new location screen of the software used by inspectors pursuant to the infrared inspection and reporting process and system of FIG. 1.
Figure 7:
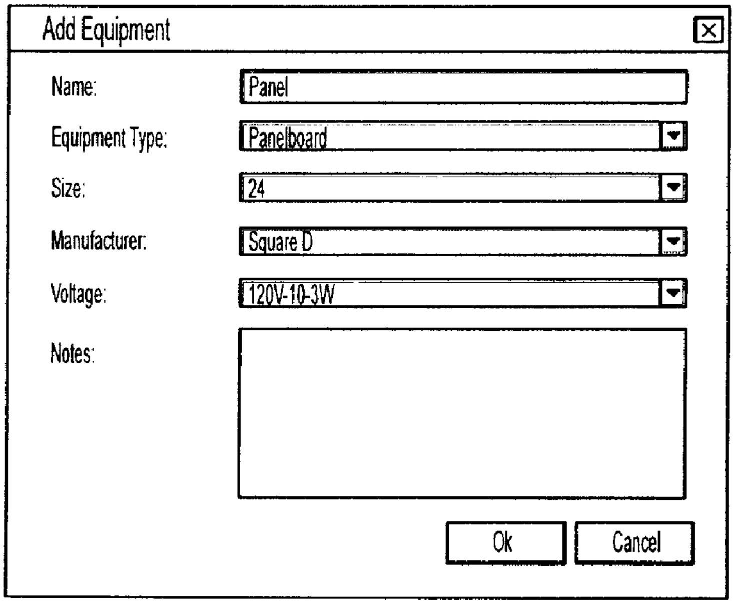
FIG. 7 is a new equipment screen of the software used by inspectors pursuant to the infrared inspection and reporting process and system of FIG. 1.

As the inspector inventories the equipment (14) within the facility (12), new locations within the facility (14) can be added by selecting the "New Location" button (28) to open a new location screen. As best shown in FIG. 6, the new location screen allows the inspector to input a location name and identify a parent location for the newly entered location. A location tree (30) for the facility (12) is preferably shown so that the parent location can be easily selected. New equipment (14) within the facility (12) can be added by selecting the "New Equipment" button (32) to open a new equipment screen. As best shown in FIG. 7, the new equipment screen fields to allow the inspector to input an equipment name, type, size, manufacturer, voltage, and any notes. Preferably pull down menus are provided for these fields to ease data entry. To enter barcode information or to subsequently call up data for equipment, the inspector selects the "Scan Barcode" button (34) and scans the barcode attached to the equipment (14).

Figure 8:
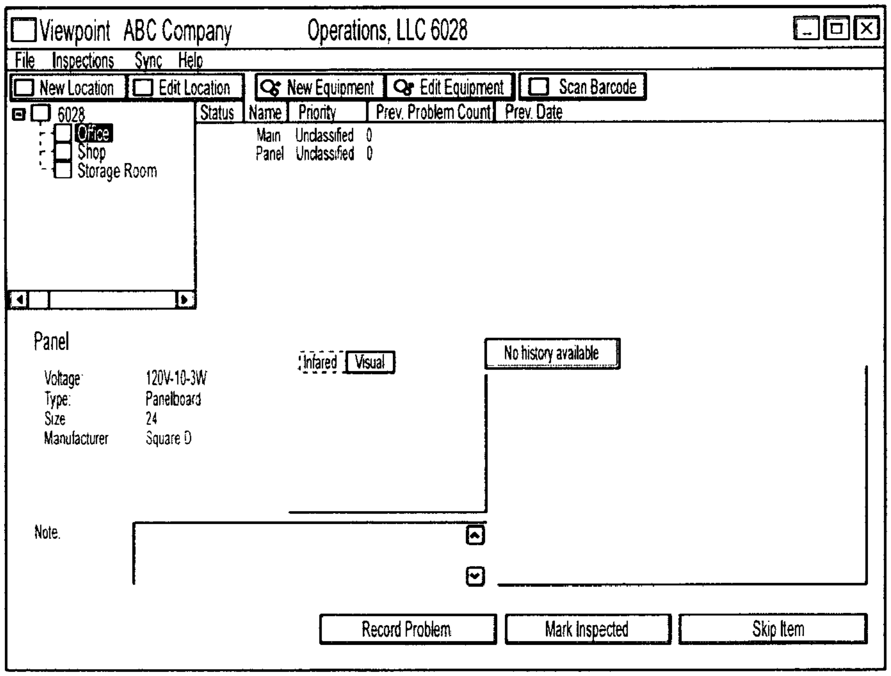
FIG. 8 is an inspection form screen similar to that of FIG. 5 but with data entered.
Figure 9:
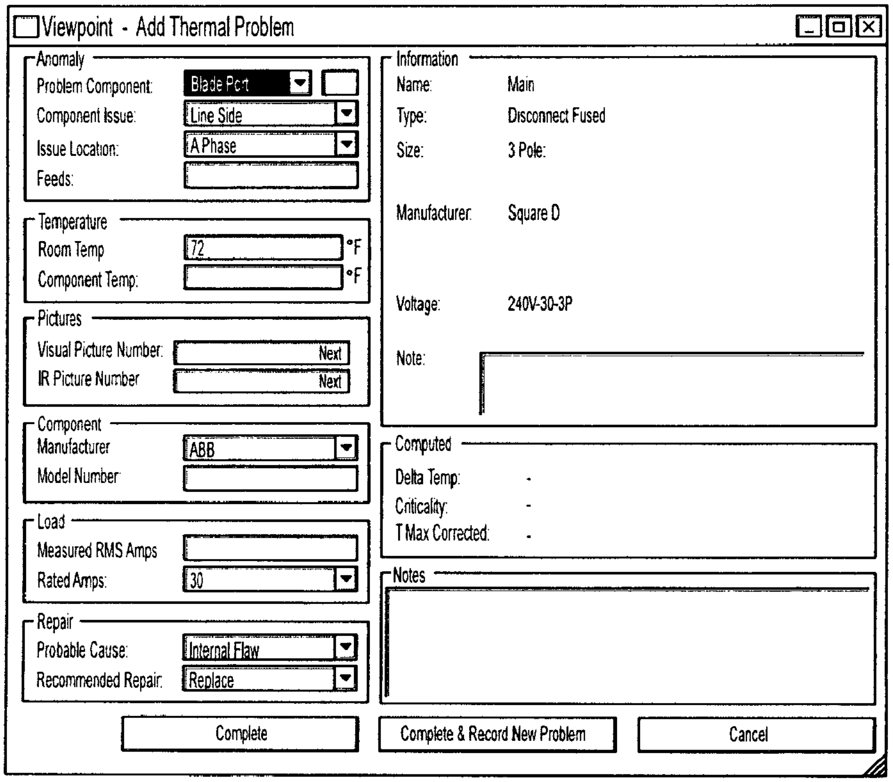
FIG. 9 is blank record problem screen of the software used by inspectors pursuant to the infrared inspection and reporting process and system of FIG. 1.

As best shown in FIG. 8, the inspector selects the "Record Problem" button (36) if a problem is located to open an add thermal problem screen. As shown in FIG. 9, the add thermal problem screen includes fields for the inspector to enter information regarding the anomaly or problem including the problem component, the component issue, and the issue location. The add thermal problem screen also includes fields for the inspector to enter information regarding the component including the manufacturer and information regarding the component load included its rated amps. The add thermal problem screen further includes fields for the inspector to enter information regarding needed repair of the component including the probable cause and the recommended repair. Preferably pull down menus are provided for these fields to ease data entry. The room or ambient temperature is preferably automatically measured and recorded on the add thermal problem screen as described below.

Figure 10:
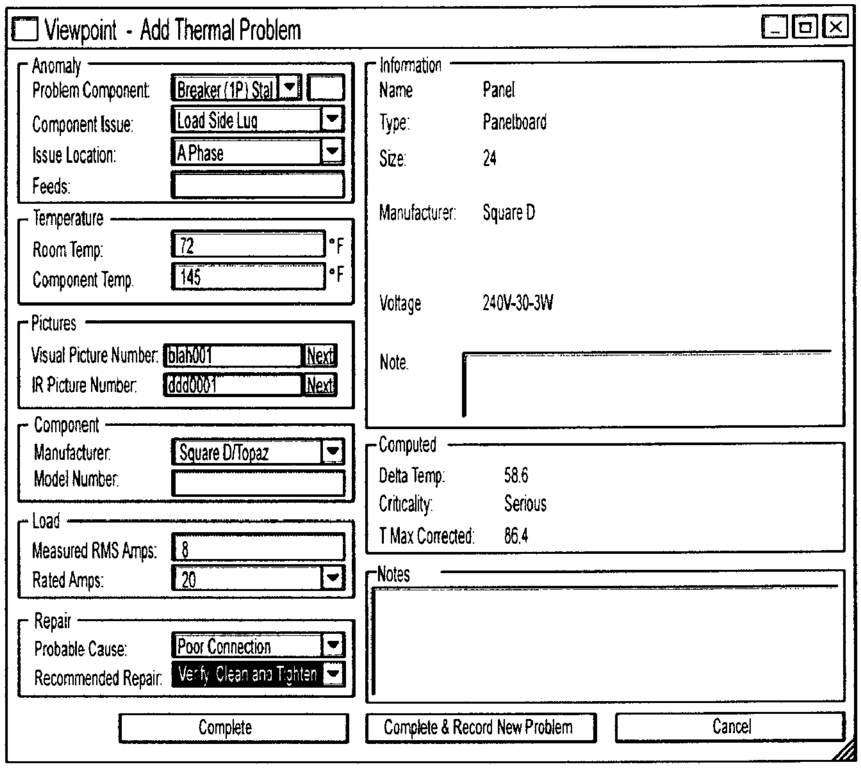
FIG. 10 is a record problem screen similar to FIG. 9 but with additional data computed and displayed.

As best shown in FIG. 10, the inspector takes an infrared image using an infrared imaging and measuring camera (38) and measures the component temperature, ambient temperature, and the component load, using the measured RMS amps and rated amps. These statistics are entered on the add thermal problem screen. The software automatically computes and displays a component delta temperature, a criticality or severity level of the problem, and a corrected temperature maximum. The delta temperature is the difference between the current temperature and the corrected maximum temperature. The criticality is a rating that identifies the severity of the problem. The corrected maximum temperature is the maximum temperature that the component should be at if there is not a problem.

Once the inspector finishes data entry for the problem, the inspector selects the "Complete & Record New Problem" button (40) if there is an additional problem to enter or selects the "Complete" button (42) if the inspection has been completed. The "Complete & Record New Problem" button (40) opens a new add thermal problem screen (best shown in FIG. 9). The "Complete" button (42) opens a complete inspection screen (best shown in FIG. 11).

Figure 12:
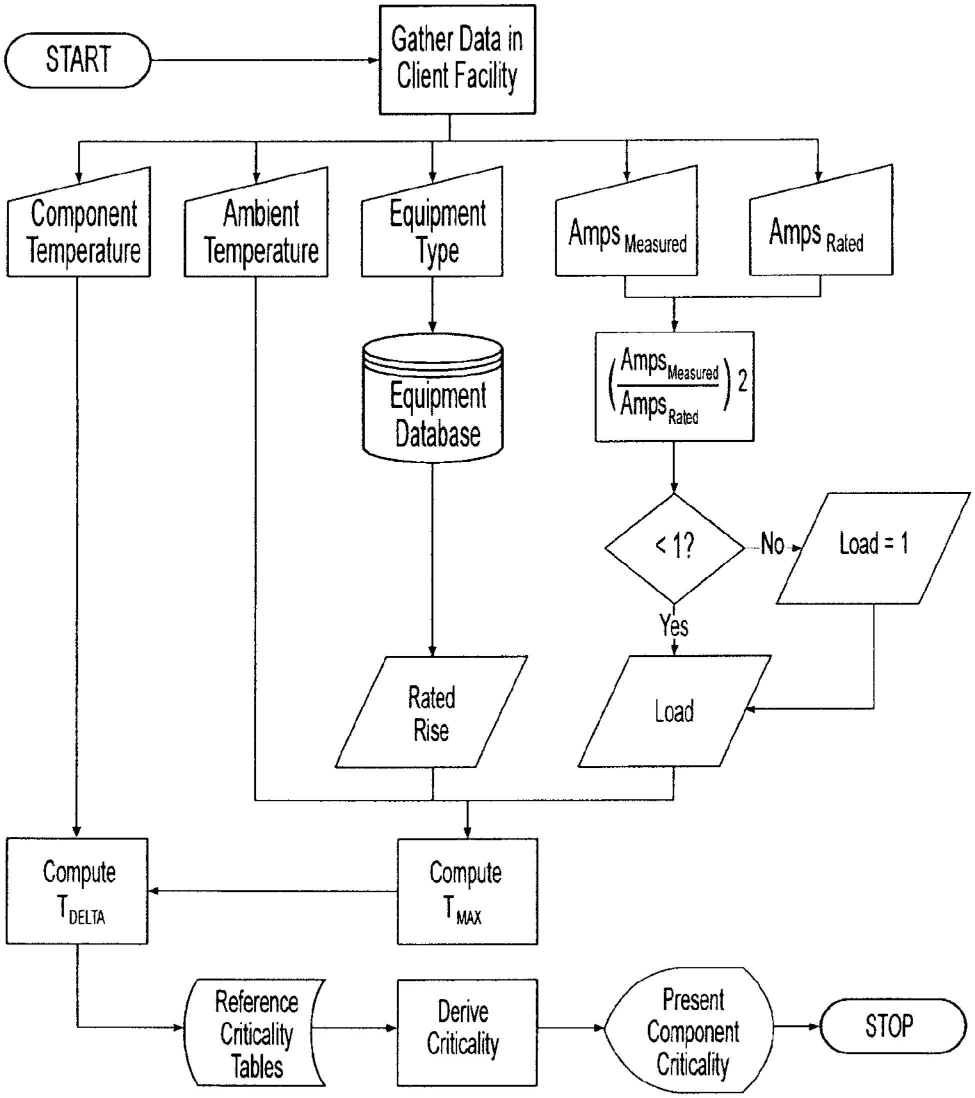
FIG. 12 is a block diagram of a process for determining problem criticality according to the present invention.

FIG. 12 illustrates how the criticality for each problem is preferably calculated by the software. First the inspector must gather needed data and enter it into the software in the client facility (12). The needed data includes the component temperature ($T_{Component}$), the ambient temperature ($T_{Ambient}$), the equipment type, the component operating load ($Amps_{Measured}$), and the component rated load ($Amps_{Rated}$).

Typically, the component temperature and the ambient temperature are measured by the infrared imaging and measuring camera (38) and automatically input into the software by the camera (38) when an infrared image of the component is taken as discussed above. The equipment type and the component rated load ($Amps_{Rated}$) are identified and manually input into the software by the inspector. The component operating load ($Amps_{Measured}$) is typically measured by the inspector and input into the software. The software automatically determines the rated rise (Rated Rise) for the component using the equipment type and tables in an equipment database. The Rated Rise is unique to each type of equipment. The equipment database is preferably constructed using data published by the manufacturer. The Rated Rise is typically specified by the UL or the manufacturer. The software also automatically determines a calculated load using the formula $Load_{Calculated}=(Amps_{Measured}/Amps_{Rated})^2$. The component load (Load) is determined to be equal to the calculated load if the calculated load is less than 1. However, the component load (Load) is determined to be 1 if the calculated load is not less than one (an indication that the component has failed).

The component rated rise (Rated Rise) and the component load (Load) are used to calculate a component maximum temperature ($T_{MAX}$) using the formula: $T_{MAX}=(Load^2*Rated\ Rise)+T_{Ambient}$. The component maximum temperature is used to calculate the temperature delta ($T_{Delta}$) using the formula: $T_{Delta}=T_{Component}-T_{MAX}$. The component criticality is then derived using the temperature delta and criticality tables. The criticality tables preferably include a plurality of criticality or severity levels associated with different predetermined temperature ranges for the temperature delta where the severity level increases as the temperature delta increases. This is a result of the fact that an increasing temperature delta indicates an increasing likelihood of failure and thus an increasing need for repair. The criticality tables are preferably based upon NETA and/or ASTM standards. The illustrated embodiment of the criticality tables includes four severity levels: level one or minor when the temperature delta is about 0 to about 13 degrees F.; level two or Important when the temperature delta is about 14 to about 32 degrees F.; level three or serious when the temperature delta is about 33 to about 68 degrees F.; and level four or critical when the temperature delta is about 69 degrees F. or greater. It is noted that a lesser or greater number of criticality levels can be utilized. It is also noted that the criticality levels can have different predetermined temperature ranges for the temperature delta. The component criticality is preferably presented to the customer escort by the inspector at the time of the component inspection, at the completion of the facility inspection, and also through the online web-based reporting application as described hereinafter.

For example, if the problem relates to a Square D/Topaz 120V-10W breaker and the component temperature is measured to be 145 degrees F., the ambient temperature is measured to be 72 degrees F., the RMS amps is measured to be 8 and the rated amps is 20, the maximum temperature is calculated to be 86.4 degrees F. The temperature delta is calculated to be 58.6 degrees F. Therefore, the problem is assigned the third criticality level, or the serious level, because the temperature delta falls within the predetermined range of about 33 to about 68 degrees F.

Figure 11:
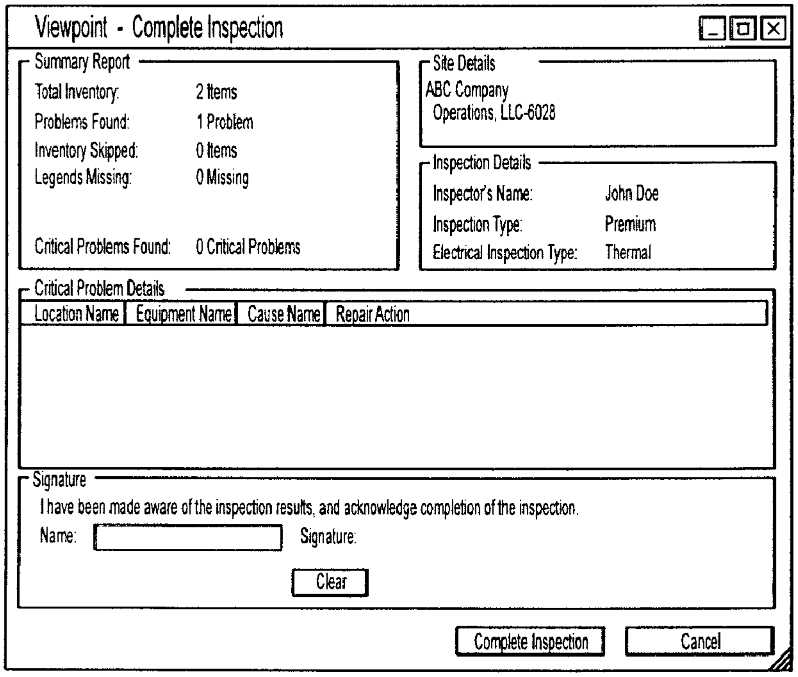
FIG. 11 is an inspection completion screen of the software used by inspectors pursuant to the infrared inspection and reporting process and system of FIG. 1.
Figure 13:
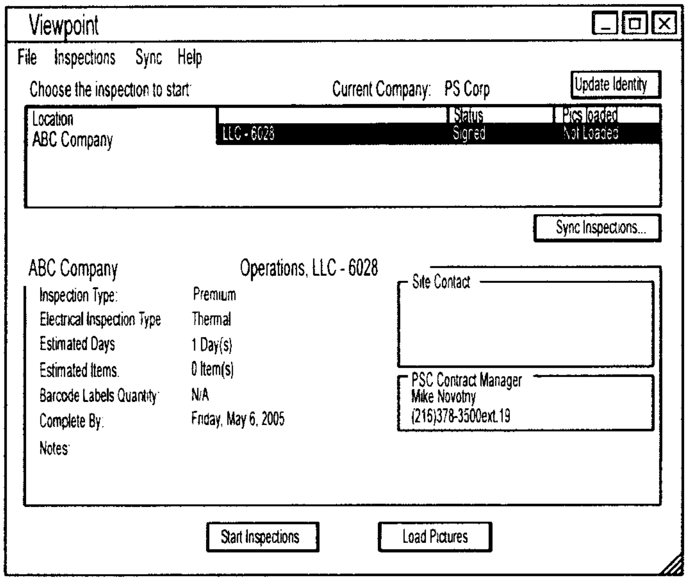
FIG. 13 is a startup screen similar to that of FIGS. 2 and 4 but with signed inspection.

As shown in FIG. 11, the complete inspection screen provides a summary report of the inspection including the total inventory inspected, the number of problems found, the number of inventory skipped, the number of legends missing, and the number of critical problems found. The illustrated complete inspection screen also includes a list of all the problems found that were identified as critical. Any of the critical problems on the list can be selected to show the screen with the details of that problem. The complete inspection screen also includes fields (44, 46) for the inspector to insert their name and signature as an acknowledgement of the completion of the inspection. The illustrated complete inspection screen allows the inspector to actually sign their name with the pen of the handheld pen computer (16). Once the inspection is complete and the complete inspection screen has been signed, the inspector selects the "Complete Inspection" button (48) to return to the startup screen. As best shown in FIG. 13, the status of the inspection is now identified as "Signed."

Figure 14:
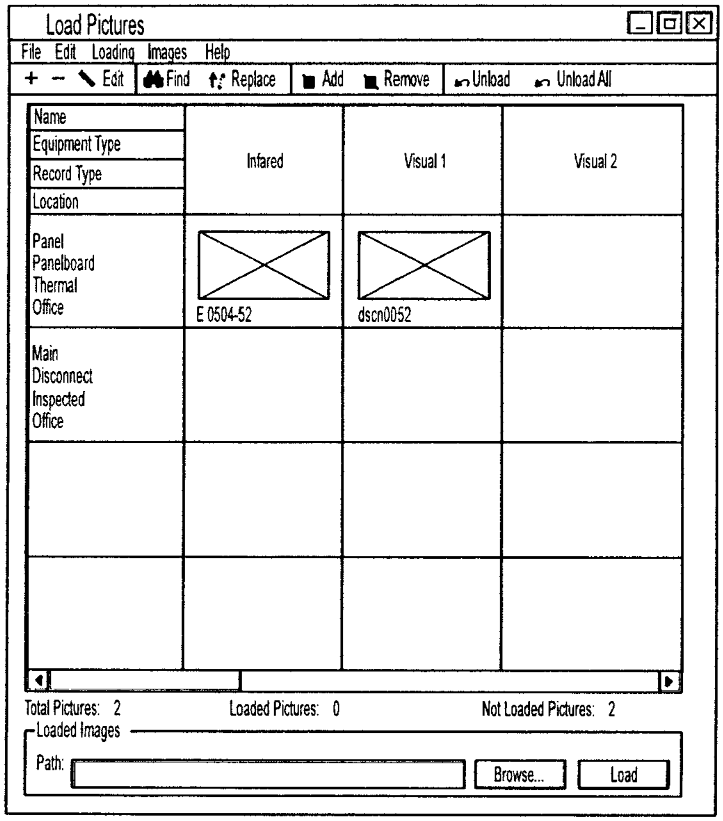
FIG. 14 is an image loader screen of the software used by inspectors pursuant to the infrared inspection and reporting process and system of FIG. 1.
Figure 15:
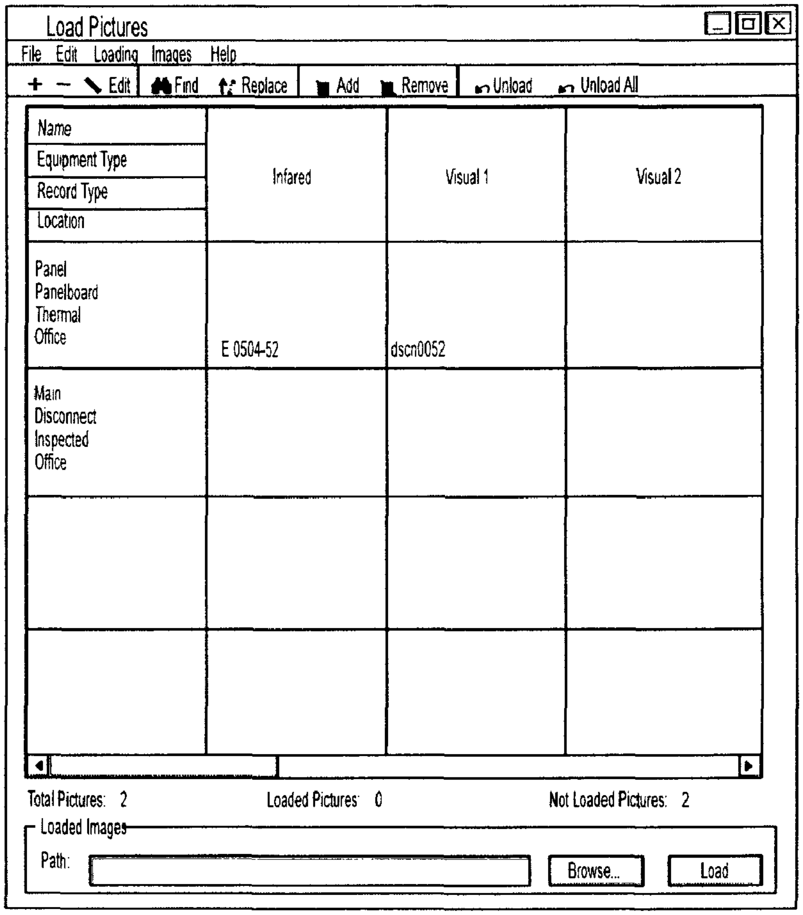
FIG. 15 is an image loader screen of the software similar to that of FIG. 14 but with images loaded.

To load pictures from the camera (38) to the handheld pen computer, the inspector selects the "Load Pictures" button (50) on the startup screen to show an image loader screen. As best shown in FIG. 14, the image loader screen includes a table of image locations where the rows identify inspected equipment (14) and the columns identify different images for the equipment in each row. The illustrated image loader screen allows three columns to be viewed simultaneously, a first column for an infrared image, a second column for a first visual image and a third column for a second visual image. Additional columns can be viewed by scrolling the window. Identification information appears in the location were images have been taken by the camera (38) but have not been loaded. The illustrated image loader screen also identifies the total number of pictures taken, the number of loaded pictures and the number of pictures that have not been loaded. The inspector selects the image or images to be loaded and then selects the "Load" button (52) to load the images. As best shown in FIG. 15, the images appear on the image loader screen once they are loaded into the handheld pen computer (38). The inspector returns to the startup screen and the status of the pictures is now identified as "Loaded."

Figure 16:
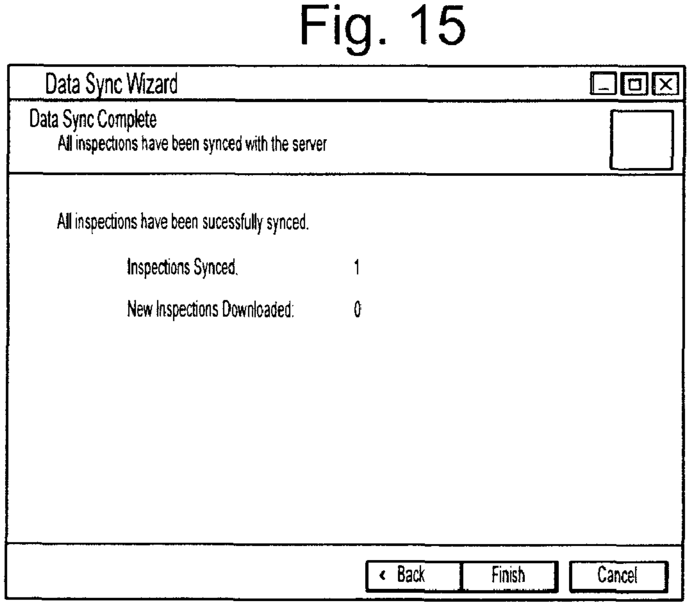
FIG. 16 is a data sync complete screen of the software used by inspectors pursuant to the infrared inspection and reporting process and system of FIG. 1.

From the startup screen, the inspector selects the inspections to be uploaded and then selects the "Sync Inspections" button (18) to initiate the data synch wizard to upload the inspection data to the server (20) of the service provider. As best shown in FIG. 16, a data sync complete screen indicates when all of the selected inspections have been successfully synchronized with the server (20) of the service provider. The inspector then selects the "Finish" button (54) to return to the startup screen where the software can be exited.

Figure 17:
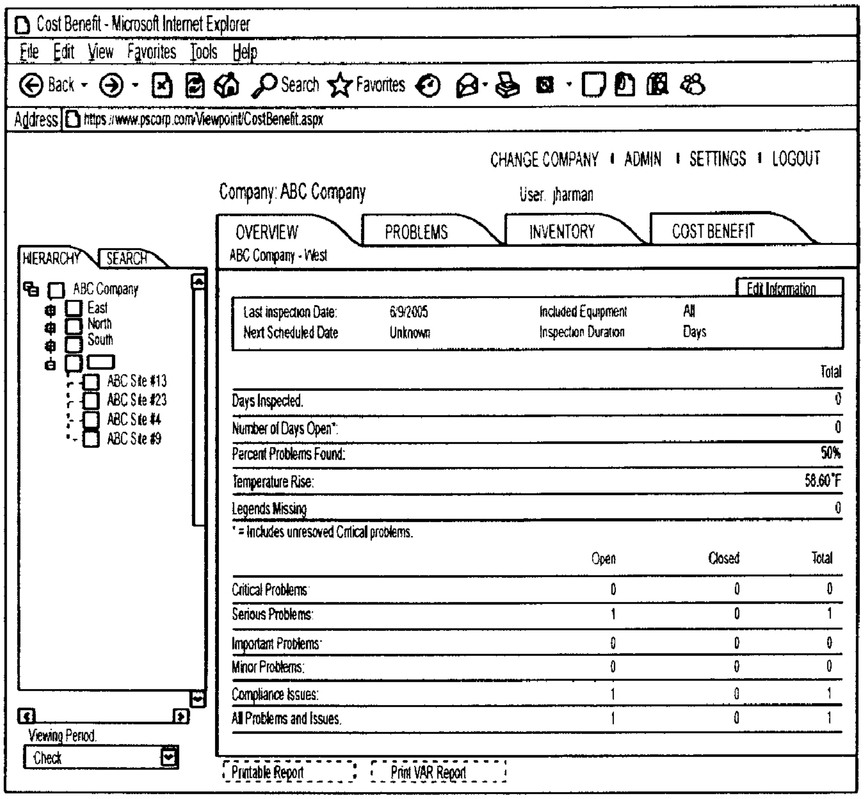
FIG. 17 is an inspection overview screen of a website used by customers pursuant to the infrared inspection and reporting process and system of FIG. 1.

Once the inspection data is uploaded by the inspector to the server (20), the inspection data is accessed and reviewed by the service provider using a home office computer (56) to ensure accurate completion. Once reviewed and approved, the inspection data is made available to the customer over the Internet 24 using a customer computer (58) via an online web-based reporting application. The customer therefore can access the inspection information from the customer's administrative offices (60) or from anywhere else having Internet access. As shown in FIG. 17, an inspection overview screen of the reporting application provides online, interactive analysis and reporting of the infrared inspection. The customer can search, sort, and aggregate the inspection data. A hierarchy of the customer locations is provided so that all or any portion of the customer's sites can be viewed and analyzed. The illustrated inspection overlay screen includes an overview layer, a problems layer, and a cost benefit layer. The overview layer includes a summary of the inspection data including the last inspection date and a summary of open and closed problems for each criticality level and all levels.

Figure 18:
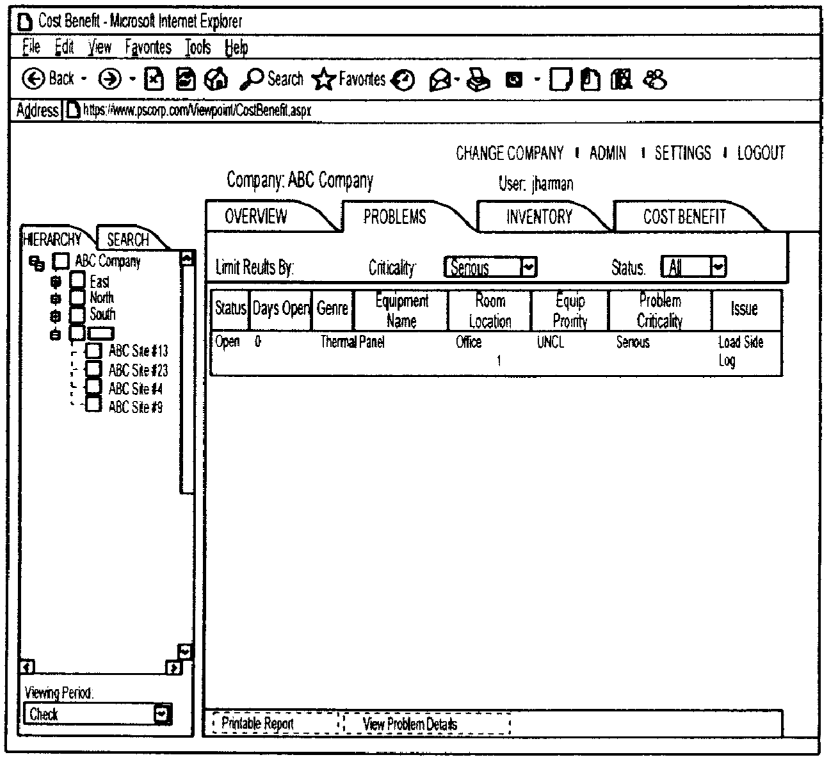
FIG. 18 is a problem listing screen of a website used by customers pursuant to the infrared inspection and reporting process and system of FIG. 1.
Figure 19:
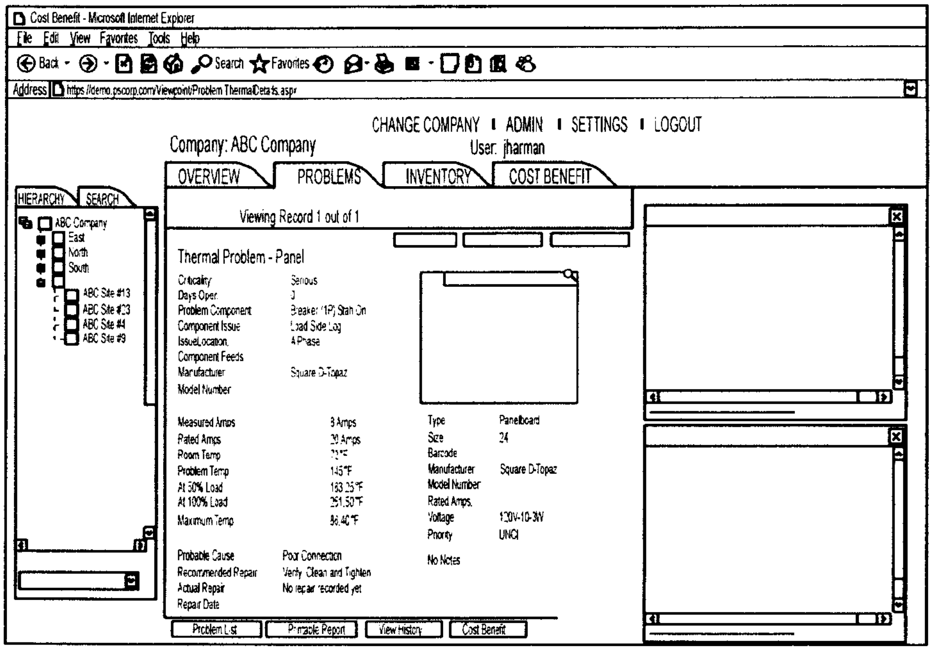
FIG. 19 is a thermal problem detail screen with images in new windows of a website used by customers pursuant to the infrared inspection and reporting process and system of FIG. 1.

As best shown in FIG. 18, the problems layer displays a listing of all problems meeting a selected criticality and status. Any problem can be selected to go to a problem detail screen. As best shown in FIG. 19, the problem detail screen displays details of the problem including the criticality, measured amps, rated amps, ambient temperature, the detected problem temperature, the calculated temperature at 50% load, the calculated temperature at 100% load, and the calculated maximum temperature. The problem detail screen also displays the probable cause for the problem, the recommended repair, the actual repair, and the repair date. The problem detail screen further displays the infrared and visual images of the component.

Figure 20:
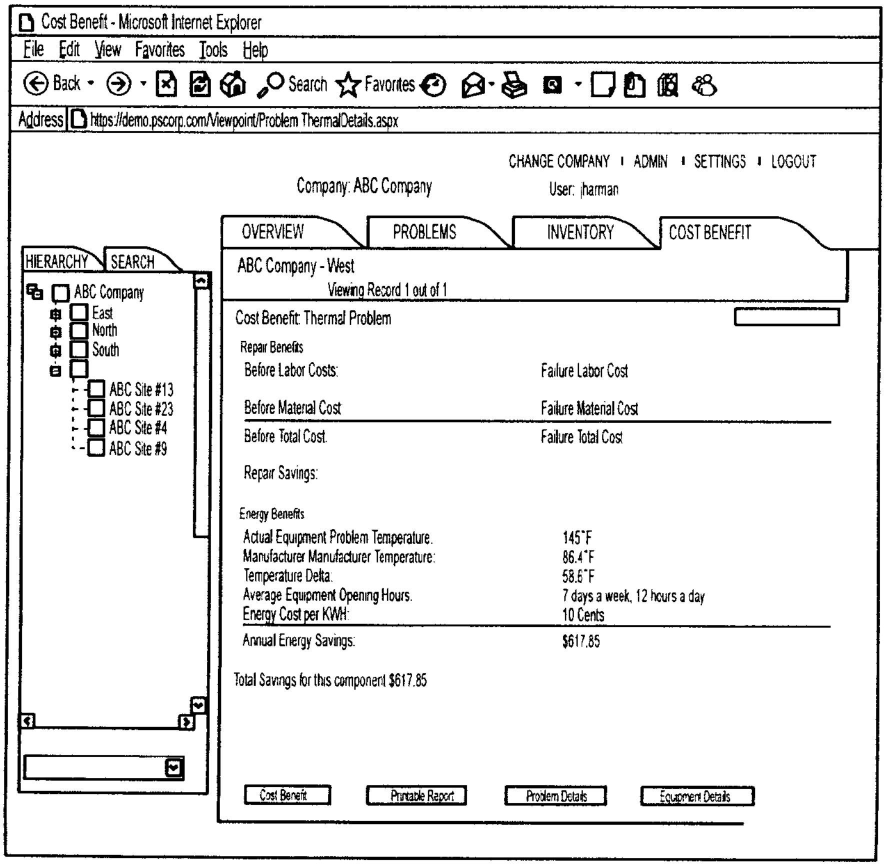
FIG. 20 is a cost benefit screen of a website used by customers pursuant to the infrared inspection and reporting process and system of FIG. 1.

As best shown in FIG. 20, the cost benefit layer displays information regarding repair benefits and energy benefits and is an interactive cost benefit analysis tool which allows the customer to see how much money is saved in potential repair costs, fines, and energy. The customer can interact with the site to customize the settings and energy savings calculations. For example, to customize variables such as the average equipment operating hours or the energy cost per KWH, the customer selects the "Edit Information" button (62) and settings windows appear which permit the customer to change the variables. Once the variables are changed, the software automatically updates the calculations such as the predicted energy savings. With the criticality information and the customized cost benefit analysis, the customer can decide which repairs should be made and when they should be made. While the customer is typically responsible for managing the repairs internally, the repairs are tracked and the customer is alerted to the actual status of repairs via the web based software. Alternatively, the service provider can additionally manage the repairs for the customer.

Figure 21:
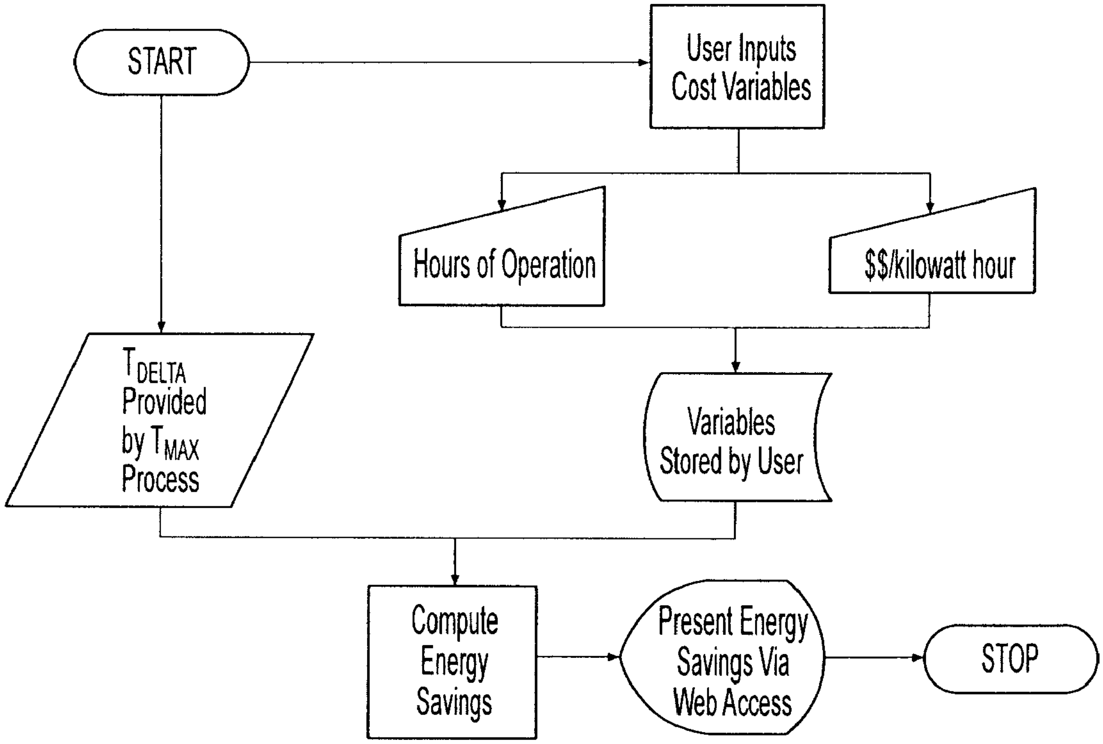
FIG. 21 is a block diagram of a process for determining energy savings according to the present invention.

FIG. 21 illustrates how the predicted energy savings are preferably calculated by the software. First the user enters and stores cost variables such as hours of operation (preferably in hours) and electrical or energy costs (preferably in $/kilowatt-hr). The application then automatically calculates the predicted energy cost savings using the previously calculated temperature delta for the problem and the stored cost variables. The energy cost savings are preferably calculated using the formula: Annual Energy Savings=$t*c*f(u)*T_{Delta}$, where t=(average hours of operation for a week)*52, c=electrical costs in $/kilowatt-hour, and f(u) is an energy usage function that translates $T_{Delta}$ into kilowatts consumed per hour. The energy usage function is preferably the empirically derived function of $f(u)=0.0185+0.003*T_{Delta}^{0.155}$. It is noted, however, that the energy usage function can alternatively be any other suitable function, empirical or otherwise. It is noted that the predicted energy savings can alternatively be calculated for any suitable period other than the illustrated annual period.

For example, if the problem relates to the above noted Square D/Topaz 120V-10W breaker and the where the temperature delta is calculated to be 58.6 degrees F. and the customer inputs the hours of operation as 12 hours day, for 7 days a week, and the energy cost per kilowatt-hour as 10 cents, the predicted annual energy savings are calculated to be $617.85.

From the forgoing disclosure and detailed description of certain preferred embodiments, it is apparent that the standardized process ensures that the customer receives accurate, consistent reporting, even from multiple locations.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A method of reporting an infrared inspection comprising the steps of:

receiving a temperature of a component having a problem;

receiving hours of operation for the component;

receiving electrical costs for the component;

computing, using a computer, predicted energy savings if the component is repaired using the formula Energy Savings=$t*c*f(u)*T_{Delta}$, wherein t is the hours of operation for the component over a time period of savings, c is the electrical costs for the component in $/kilowatt hr, f(u) is an energy usage function that translates $T_{Delta}$ into kilowatts consumed per hour, and $T_{Delta}$ is a temperature delta between the temperature of the component and a maximum desired temperature for the component; and displaying the predicted energy savings to a user.

2. The method of reporting an infrared inspection according to claim 1, wherein the energy usage function is an empirically derived function.

3. The method of reporting an infrared inspection according to claim 2, wherein the energy usage function is $f(u)=0.0185+0.003*T_{Delta}^{0.155}$.

4. The method of reporting an infrared inspection according to claim 1, wherein the step of computing, using a computer, comprises computing $T_{Delta}$ using a maximum desired temperature for the component.

5. A method of reporting an infrared inspection comprising the steps of:

receiving a temperature of a component having a problem;

receiving an ambient temperature surrounding the component;

receiving hours of operation for the component;

receiving electrical costs for the component;

computing, using a computer, predicted energy savings if the component is repaired using a temperature delta between the temperature of the component and a maximum desired temperature for the component ($T_{Delta}$);

computing, using a computer, $T_{Delta}$ using a maximum desired temperature for the component;

computing, using a computer, the maximum desired temperature for the component includes calculating the maximum desired temperature ($T_{MAX}$) using the formula $T_{MAX}=(Load^2*Rated\ Rise)+T_{Ambient}$, wherein the Load is the electrical load on the component, the Rated Rise is the rated rise specified for the component, and the $T_{Ambient}$ is the ambient temperature surrounding the component; and displaying the predicted energy savings to a user.

6. The method of reporting an infrared inspection according to claim 1, wherein the temperature of the component, the hours of operation for the component, and the electrical costs for the component are obtained via an interactive online website and the predicted energy savings is calculated and displayed in real time via the interactive online website.

7. A method of reporting an infrared inspection comprising the steps of:

receiving a temperature of a component and ambient temperature surrounding the component from an infrared imaging and measuring camera;

receiving hours of operation for the component via an interactive online website;

receiving electrical costs for the component via the interactive online website;

computing, using a computer, predicted energy savings if the component is repaired using the formula Energy Savings=$t*c*f(u)*T_{Delta}$, wherein t is the hours of operation for the component over a time period of savings, c is the electrical costs for the component in $/kilowatt hr, f(u) is an empirically derived energy usage function that translates $T_{Delta}$ into kilowatts consumed per hour, and $T_{Delta}$ is a temperature delta between the temperature of the component and a maximum desired temperature for the component; and displaying the predicted energy savings to a user via the interactive online website.

8. The method of reporting an infrared inspection according to claim 4, wherein the step of computing, using a computer, comprises computing the maximum desired temperature ($T_{MAX}$) using the formula $T_{MAX}=(Load^2*Rated\ Rise)+T_{Ambient}$, wherein the Load is the electrical load on the component, the Rated Rise is the rated rise specified for the component, and the $T_{Ambient}$ is the ambient temperature.

9. The method of reporting an infrared inspection according to claim 5, wherein the step of computing the predicted energy savings includes using the formula Energy Savings=$t*c*f(u)*T_{Delta}$, wherein t is the hours of operation for the component over a time period of savings, c is the electrical costs for the component in $/kilowatt hr, and f(u) is an energy usage function that translates $T_{Delta}$ into kilowatts consumed per hour.

10. The method of reporting an infrared inspection according to claim 9, wherein the energy usage function is an empirically derived function.

11. The method of reporting an infrared inspection according to claim 10, wherein the energy usage function is $f(u)=0.0185+0.003*T_{Delta}^{0.155}$.

12. The method of reporting an infrared inspection according to claim 5, wherein the component temperature and the ambient temperature are received from an infrared imaging and measuring camera.

13. The method of reporting an infrared inspection according to claim 7, wherein the energy usage function is an empirically derived function.

14. The method of reporting an infrared inspection according to claim 13, wherein the energy usage function is $f(u)=0.0185+0.003*T_{Delta}^{0.155}$.

15. The method of reporting an infrared inspection according to claim 7, wherein the step of computing, using a computer, comprises computing $T_{Delta}$ using a maximum desired temperature for the component.

16. The method of reporting an infrared inspection according to claim 15, wherein the step of computing, using a computer, comprises computing the maximum desired temperature ($T_{MAX}$) using the formula $T_{MAX}=(Load^2*Rated\ Rise)+T_{Ambient}$, wherein the Load is the electrical load on the component, the Rated Rise is the rated rise specified for the component, and the $T_{Ambient}$ is the ambient temperature.

* * * * *